United States Patent
Chang et al.

[11] Patent Number: 6,091,415
[45] Date of Patent: Jul. 18, 2000

[54] SYSTEM AND METHOD FOR DISPLAYING MULTIPLE DIALOG BOXES IN A WINDOW DISPLAY

[75] Inventors: Jackson C. S. Chang; Chaucer C. C. Chiu, both of Taipei, Taiwan

[73] Assignee: Inventec Corporation, Taipei, Taiwan

[21] Appl. No.: 08/963,755

[22] Filed: Nov. 4, 1997

Related U.S. Application Data

[60] Provisional application No. 60/045,297, May 2, 1997.

[51] Int. Cl.[7] .................................................... G06F 3/14
[52] U.S. Cl. ........................................ 345/347; 345/353
[58] Field of Search ................................. 345/339, 342, 345/347, 348, 352, 353, 356, 357, 336, 338, 145, 146, 968, 975; 707/1

[56] References Cited

U.S. PATENT DOCUMENTS

| | | | |
|---|---|---|---|
| 4,821,211 | 4/1989 | Torres .................................... | 345/357 |
| 5,287,448 | 2/1994 | Nicol et al. ......................... | 345/338 X |
| 5,434,965 | 7/1995 | Matheny et al. ...................... | 345/338 |
| 5,485,569 | 1/1996 | Goldman et al. .................... | 345/326 X |
| 5,546,521 | 8/1996 | Martinez ............................. | 345/338 |
| 5,546,527 | 8/1996 | Fitzpatrick et al. ................... | 345/348 |
| 5,588,107 | 12/1996 | Bowden et al. ..................... | 345/356 X |
| 5,748,927 | 5/1998 | Stein et al. .......................... | 345/347 X |
| 5,751,980 | 5/1998 | Musashi et al. ..................... | 345/354 |
| 5,754,176 | 5/1998 | Crawford ............................ | 345/338 |
| 5,790,122 | 8/1998 | Cecchini et al. .................... | 345/357 |
| 5,914,716 | 6/1999 | Rubin et al. ........................ | 345/347 |
| 5,914,717 | 6/1999 | Kleewein et al. ................... | 345/352 |
| 5,943,053 | 8/1999 | Ludolph et al. .................... | 345/342 |

*Primary Examiner*—Crescelle N. dela Torre
*Attorney, Agent, or Firm*—Chien-Wei (Chris) Chou; Oppenheimer Wolff & Donnelly LLP

[57] ABSTRACT

A system and method for displaying multiple dialog boxes in a window display is disclosed. In a specific embodiment of the present invention, a method for generating a dialog box in an environment of window display using a pointer associated with a pointing device is described. The dialog box may be opened by placing the pointer above an object to be selected and moving the pointer downward across the object to be selected. An operation as is described opens a preserved principal dialog box associated with the selected object. The principal dialog box in accordance with the above procedure remains opened regardless whether the pointer is still within the boundary of the principal dialog box. The opened dialog box may be closed by placing the pointer below the selected object and moving the pointer upwardly across the selected object.

21 Claims, 13 Drawing Sheets

Fig. 7B

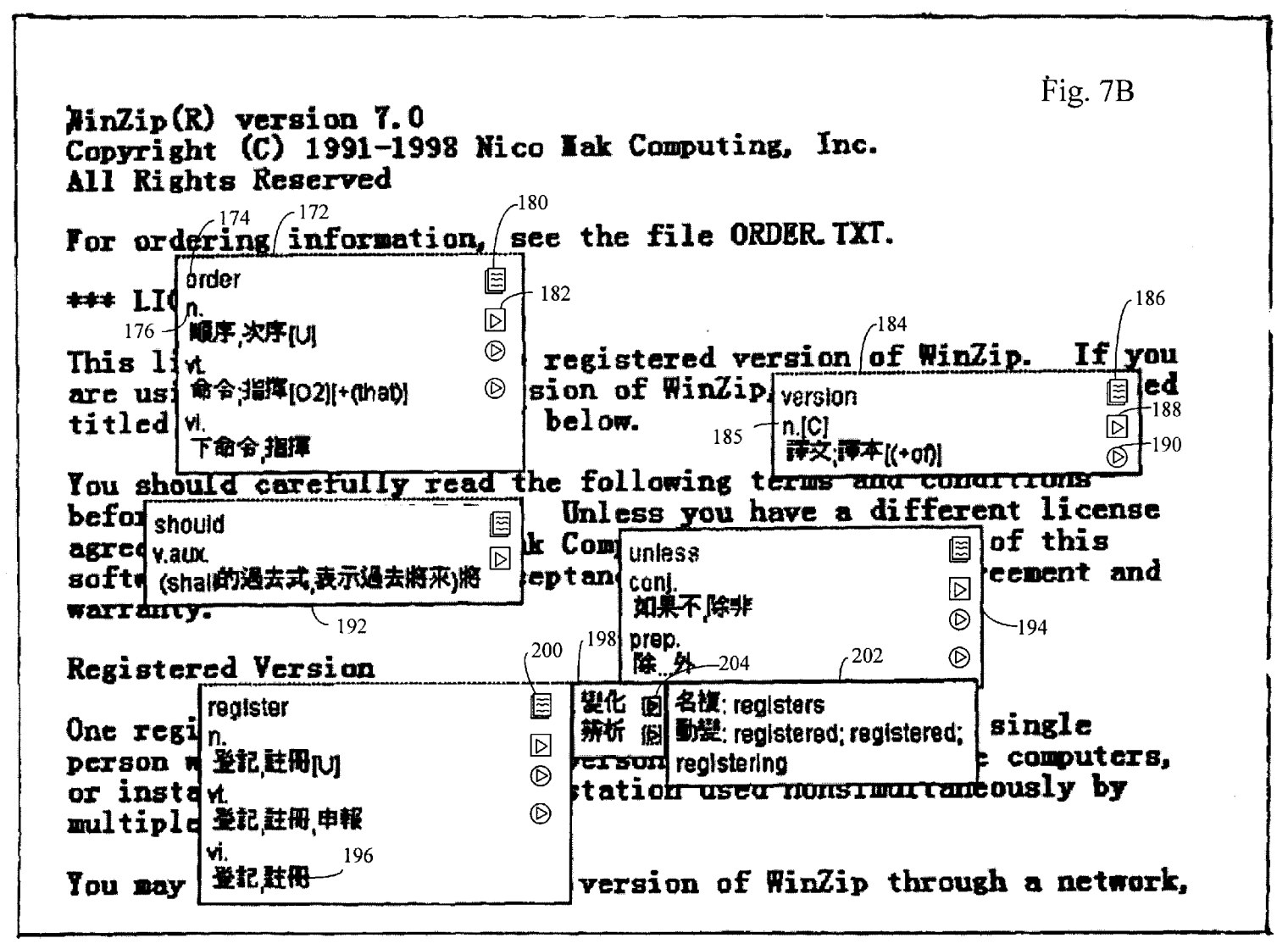

```
WinZip(R) version 7.0
Copyright (C) 1991-1998 Nico Mak Computing, Inc.
All Rights Reserved For ordering information, see the file ORDER.TXT.

*** LI[  ]
       order
       n.
       順序,次序[U]
       vt.
       命令,指揮[O2][+(that)]
       vi.
       下命令,指揮

This li[  ] registered version of WinZip. If you
are us[  ] sion of WinZip
titled              version
below.          n.[C]
                譯文,譯本[(+of)]

You should carefully read the following terms and conditions
befo[  ] should              Unless you have a different license
agre[  ] v.aux.              ement and
soft[  ] (shall的過去式,表示過去將來)將         single
warra[  ]                                      computers,
                        unless                station users simultaneously by
                        conj.
                        如果不,除非
                        prep.
                        除…外
Registered Version                   registers
                                     registered;registered;
       register                      registering
       n.
       登記,註冊[U]
One regi[  ] vt.
person   登記,註冊,申報
or insta[  ] vi.
multiple   登記,註冊

You may 登記,註冊                          version of WinZip through a network,
```

SYSTEM AND METHOD FOR DISPLAYING MULTIPLE DIALOG BOXES IN A WINDOW DISPLAY

CROSS-REFERENCE TO RELATED APPLICATIONS

Reference is made to and priority claimed from U.S. Provisional Application Ser. No. 60/045,297, filed May 2, 1997 pending, titled "System and Method for Displaying Multiple Dialog Boxes in a Window Display."

BACKGROUND OF THE INVENTION

1. Field of the Invention

This invention relates generally to systems and methods for displaying messages on computer systems, and more particularly to a system and method for displaying messages in multiple levels of dialog boxes in an environment of window display.

2. Description of the Prior Art

Windows-based application programs are mostly menu driven. A menu is an input tool in a Windows application that contains a list of items. The items on the menu list can be selected with a keyboard or a pointing device, such as a mouse or a roll ball. An item in a menu bar can be used to trigger the display of a drop-down menu (a "window"). Items on a drop-down menu may further trigger the display of another drop-down menu. When using a pointing device to invoke a drop-down menu, a user usually needs to put the pointer of a pointing device on an item in the menu and click the mouse or roll ball button. Clicking on the mouse button could be a burden to the user if the user frequently needs to access items on the drop-down menu.

In an environment of window display, an application program may introduce information unique to the program in a dialog box instead of creating its own windows. A dialog box is convenient to use because the contents in the dialog box can be predefined. To display the contents of a dialog box usually requires the user to type in an alphabet character or click the mouse button. Again, clicking on the mouse button may be burdensome and time-consuming if the user of the application program constantly needs to access the contents of dialog boxes.

Electronic dictionaries and language interpreters have been developed which provide for efficient and rapid retrieval of information which is stored in the memory. These electronic dictionaries or language interpreters usually display only one word and the associated meaning at a time. No method is provided with which a user can look up several words in one window display.

Similarly, an electronic diary or electronic organizer is not capable of simultaneously displaying multiple dialog boxes in one window display. It is inconvenient to the users that they do not have all the pertinent information on the screen.

SUMMARY OF THE INVENTION

It is an object of the present invention to provide a method that displays menus or dialog boxes automatically without clicking the mouse button or entering a keystroke on the keyboard.

It is another object of the present invention to provide a method that displays various types of information in a family of dialog boxes. These dialog boxes in the same family may be cascaded together so that each of them only occupies a small portion of the window display, but is capable of displaying a large amount of associated information.

It is a further object of the present invention to provide an improved electronic dictionary capable of displaying a plurality of translated words, synonyms, antonyms, audio pronunciation, bilingual translation, exemplary sentences, etc. in a plurality of dialog boxes.

In an electronic dictionary, especially in a bilingual dictionary, a user may need to look up many words before he or she understands the meaning of a sentence. It is desired that the meaning or definition of a word pop up without clicking the mouse button while the reader is reading the article. Further, it is helpful to the reader of an article or the user of an electronic dictionary if the meaning of each word remains displayed while the user or reader is looking up another word on the same page of displayed screen. It is therefore an object of the present invention to provide multiple dialog boxes that may be displayed simultaneously in the same window.

A user of an electronic diary or electronic organizer may want to schedule his or her appointments or review his or her schedules. It is desirable that many events may be displayed at the same time. Hence, it is another object of the present invention to provide such capability in displaying multiple dialog boxes simultaneously.

In a specific embodiment of the present invention, a method for generating a dialog box in an environment of window display using a pointer associated with a pointing device is described. The dialog box may be opened by placing the pointer above an object to be selected and moving the pointer downward across the object to be selected. An operation as is described opens a preserved principal dialog box associated with the selected object. The principal dialog box in accordance with the above procedure remains opened regardless of whether or not the pointer is still within the boundary of the principal dialog box. The opened dialog box may be closed by placing the pointer below the selected object and moving the pointer upward across the selected object.

It is an advantage of the present invention that it provides a method that displays menus or dialog boxes automatically without clicking the mouse button or entering a keystroke on the keyboard.

It is another advantage of the present invention that it provides a method that displays various types of information in a family of dialog boxes. These dialog boxes in the same family may be cascaded together so that each of them only occupies a small portion of the window display but is capable of displaying a large amount of associated information.

It is a further advantage of the present invention that it provides an improved electronic dictionary capable of displaying a plurality of translated words, synonyms, antonyms, audio pronunciation, bilingual translation, exemplary sentences, etc., in a plurality of dialog boxes.

It is another advantage of the present invention that in an electronic organizer many events may be displayed in multiple dialog boxes simultaneously.

The foregoing and other objects, features and advantages of the present invention will be apparent to those skilled in the art after having read the following detailed description of the preferred embodiments which make reference to the several figures of the drawing.

IN THE DRAWINGS

FIGS. 7A–7B illustrate multiple principal dialog boxes being displayed in the same window;

DETAILED DESCRIPTION OF THE PREFERRED EMBODIMENTS

A preferred embodiment of the present invention provides a method for displaying messages in multiple dialog boxes in a single window display on a Windows-based computer system. A dialog box in an environment of window display of a computer system is a temporary window that is created for input purposes and is then closed after the task is completed. An application typically uses a dialog box to prompt the user for additional dialog boxes to display multiple information or events so that users may view multiple independent or dependent information in one window display.

Figure 1:
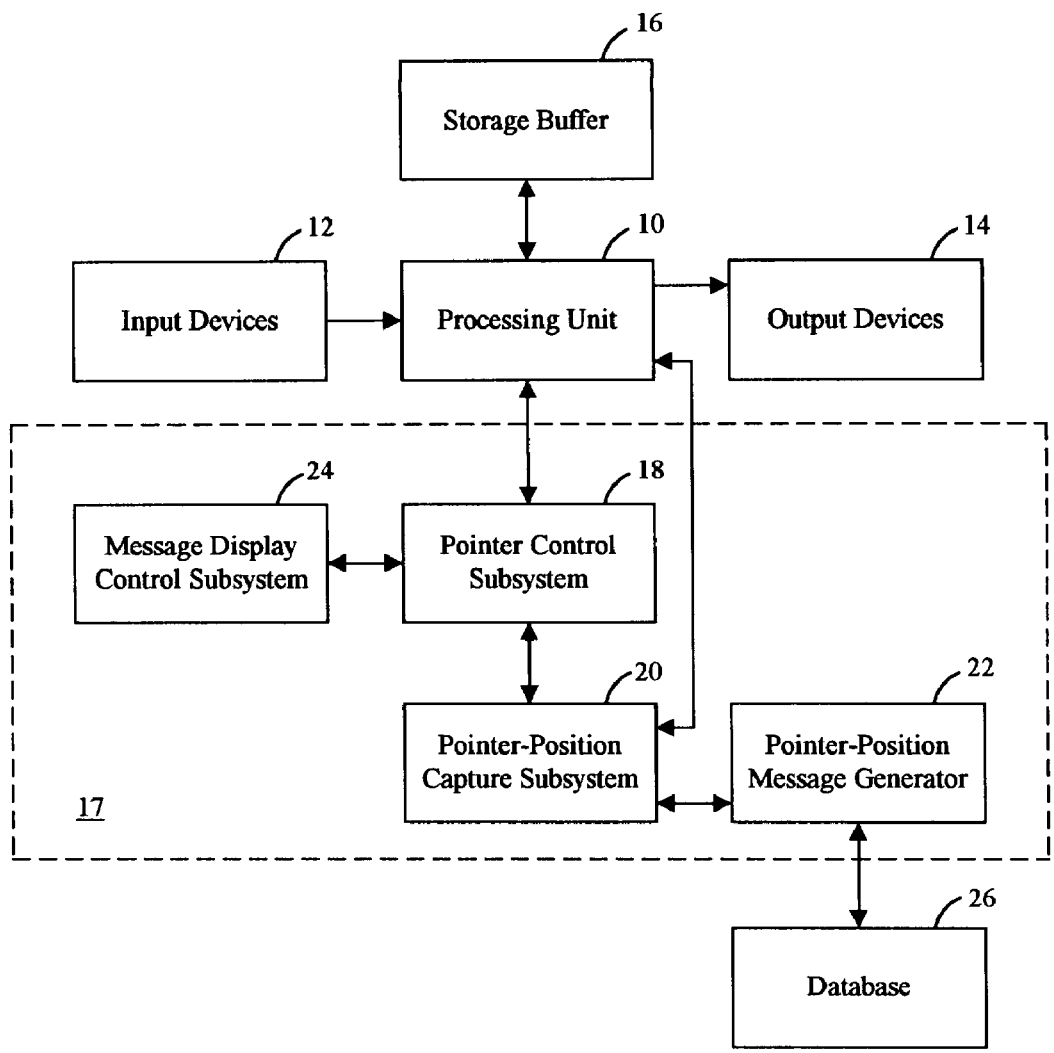
FIG. 1 is a block diagram of the preferred embodiment of the message display system.

FIG. 1 depicts a block diagram of the preferred embodiment of a message display system. In the preferred embodiment, the message display system has a processing unit 10 that controls the operation of the message display system and information processing in the system. Input devices 12, such as a keyboard, a mouse, a roll ball, or a microphone, are coupled to the processing unit 10 to provide inputs to the message display system. The input devices may use a pointer to select an item on the screen where information related to the selected item may be displayed in a dialog box. Output devices 14, such as a display monitor, a printer, or a pair of speakers, are coupled to the processing unit and receive output signals to be displayed on the monitor, or printed on the printer, or playback on the speakers. A storage buffer 16 is coupled to the processing unit 10 that provides memory for the processing unit 10 to use.

In the preferred embodiment, the storage buffer 16 is in the form of random access memory (RAM). The storage buffer 16 is an aggregate of many memory buffers in the RAM. Each buffer is used for storing data to be displayed in a dialog box or for storing data for the operation of the processing unit 10. The storage buffer 16 also provides storage for the general operation of the processing unit 10.

The preferred embodiment of the message display system further comprises a pointer and display control system 17 and a database 26. The pointer and display control system 17 includes a pointer control subsystem 18, a pointer-position capture subsystem 20, a pointer-position message generator 22, and a message display control subsystem 24. The pointer control subsystem 18 is coupled to the processing unit 10 and controls the pointer-related operations such as the location to open a dialog box for the selected object. The pointer-position capture subsystem 20 is coupled to the pointer control subsystem 18, and vice versa. Data may be transferred from the pointer-position capture subsystem 20 to the pointer control subsystem 18. The pointer-position capture subsystem 20 identifies the object being pointed to by the pointer. The pointer-position capture subsystem 20 is also coupled to the processing unit 10 so that the processing unit 10 directly controls the operation of the capture subsystem 20. Likewise, the capture subsystem 20 could directly report its operation status to the processing unit 10.

Upon detecting that the pointer has paused on an object for a predetermined period of time, the capture subsystem 20 identifies the item as being selected. An object may also be selected by pushing a button on the pointing device (i.e., a click on the mouse button) while placing the pointer on the object. The capture subsystem 20 also informs the pointer-position message generator 22 to search information related to the identified object. The message generator 22 looks into the database 26 for the information related to the selected item and retrieves the information for display. If no direct information can be found on the selected object in the database 26, information on an object that is closest to the selected object will be allocated and retrieved. Upon retrieving information from the database 26, the message generator 22 transfers such information to the capture subsystem 20. The capture subsystem 20 advises the processing unit 10 that information is available for display in a dialog box. Based on the retrieved information, the capture subsystem 20 searches a feasible location on the window for a dialog box, and opens such a dialog box in the window. The processing unit 10, through the pointer control subsystem 18, displays the retrieved information in the opened dialog box.

The processing unit 10 can be a microprocessor, a RISC processor, a microcomputer, or a microcontroller. It is the central processing unit for the message display system. In the preferred embodiment of the present invention, the processing unit 10 controls the operation of the message display system. It controls the input devices, receives the inputs from the input devices, and puts input data from the input devices into the storage buffer 16 for processing. It processes the data to be displayed on the monitor or other output devices. The processing unit 10 controls the operation of the pointer control subsystem 18, so that an area may be allocated on the window for displaying a dialog box.

Database 26 is a memory device that contains a large volume of data related to the objects that can be selected by the pointer. The database 26 provides messages to be displayed to pointer position message generator 22. In the preferred embodiment, the memory could be in the forms of a hard disk, an optical disk or a laser disk, a floppy disk, a read-only memory (ROM), a programmable read only memory (PROM), a flash memory, or a PCMCIA card or PC Card. Essentially, any nonvolatile memory may be used as the storage of the database 26.

In the preferred embodiment, the pointer-position capture subsystem 20 identifies on the display an object (e.g., a word, to which the pointer is pointing. In this case, the identified word is selected by the user. The pointer-position capture subsystem 20 sends the selected object, or word, to the pointer-position message generator 22. The message generator 22 looks up the information related to the selected item in the database 26 and transfers the information to the capture subsystem 20 for display.

It is essential that the capture subsystem 20 open a dialog box upon determining that a dialog box is needed to display the information related to the selected object. It is essential that the capture subsystem 20 select an appropriate area on the display to open the dialog box before it opens one. Because the message generator 22 has retrieved the information to be displayed in the dialog box, it knows the size of the space needed on the window to display the dialog box. Therefore, the message generator 22 determines and provides the size of the dialog box to the capture subsystem 20. From the size information provided by the message generator 22, the capture subsystem 20 selects an appropriate area on the window for displaying the dialog box, and it opens the dialog box.

Figure 2A:
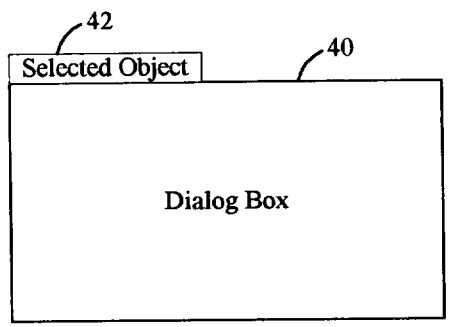
FIGS. 2A–2F are diagrams illustrating the various alternatives in opening dialog boxes in accordance with the relative location of the selected word in the window.
Figure 2B:
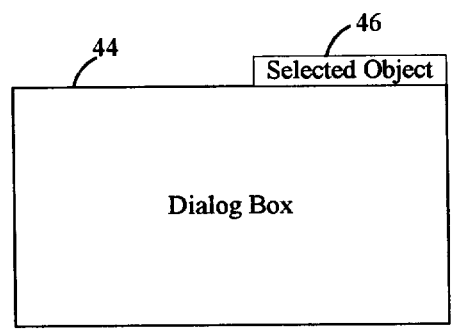
Figure 2C:
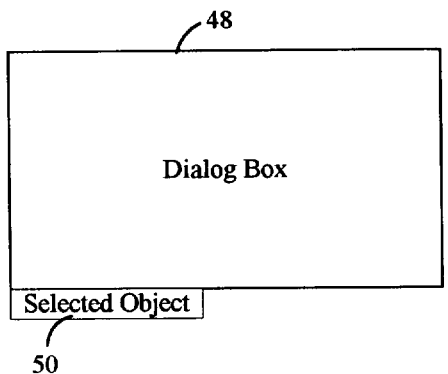
Figure 2D:
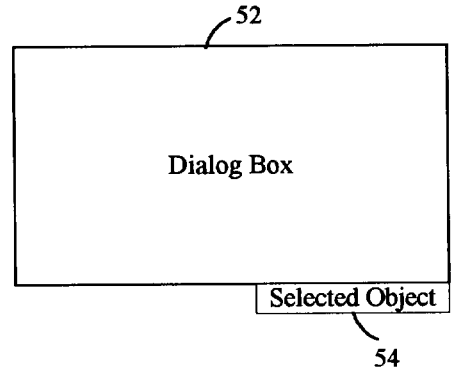
Figure 2E:
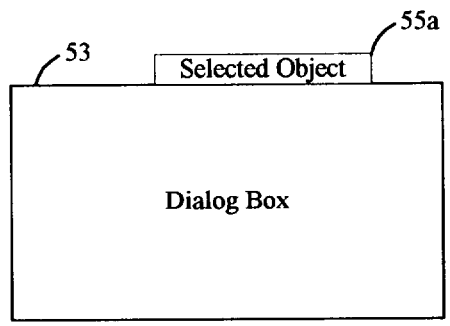
Figure 2F:
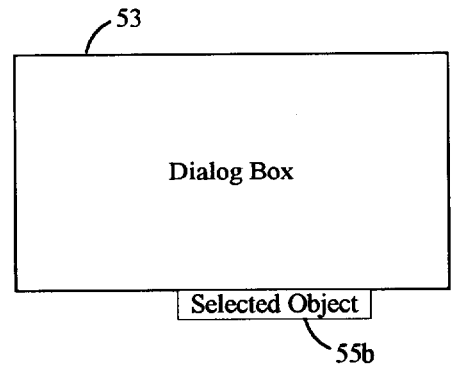

Capture subsystem 20 has several priority criteria for determining the area on the window for placing the dialog box, because the selected object could be anywhere on the window. The priority of generating a dialog box depends on the location of the selected object on the display. The first priority is from top to bottom, which means the dialog box will be generated below the selected object if possible. The second priority is to expand the dialog box from left to right. The third priority is from bottom to top of the window, which means that the dialog box will be generated above the selected object. The fourth priority is from right to left, meaning the dialog box expands toward the left. The dialog box placement priority can be illustrated as follows: If there is sufficient display area on the window below and to the right of the identified object, the dialog box is allocated below the identified object and expands to the right. This scenario is illustrated in FIG. 2A, where the dialog box 40 is below the selected object 42, and expands from the selected object 42 to its right. In a second situation, shown in FIG. 2B, a dialog box 44 is created below the selected object 46 and expands toward the left of the object 46. This scenario occurs when there is insufficient display area on the window to the right of the selected object 46 to display the dialog box 44. FIG. 2C depicts a third scenario. In the third scenario, a dialog box 48 is created above the selected object 50 and expands to the right. This happens when there is insufficient display area on the window below the identified object. A fourth alternative is illustrated in FIG. 2D, in which a dialog box 52 is generated above the selected object 54 and is expanded from right to left. This occurs when there is not sufficient display area on the window either below the selected object or to the right of the selected object. A fifth scenario may occur if there is space to expand the dialog box toward the right, but not enough to allocate the entire dialog box to the right. Under this circumstance, the dialog box will be opened toward the right first until it reaches the right edge of the window displayed. It then expands the dialog box toward the left for the needed space. This fifth scenario is illustrated in FIGS. 2E and 2F, which show that the dialog box 53 is opened either below the selected object 55a or above the selected object 55b.

Once a dialog box can be selected to display the information on the window display, information regarding the selected object is displayed in the dialog box. This process is controlled by the message display control subsystem 24. In an environment of window display, a user may open a dialog box by placing the pointer at a menu item and clicking the mouse button. The presently preferred embodiment allows a user to open a dialog box for objects in a displayed window, such objects need not be an item in a menu. In the preferred embodiment, no clicking is required to open a dialog box. However, in the preferred embodiment, a user can still open a dialog box by clicking the mouse button when the pointer is placed on the object to be selected. A dialog box can either be created temporarily or permanently. A user may place the pointer at a target item momentarily to open a temporary dialog box. In the preferred embodiment, a user may open a temporary dialog box by momentarily placing the pointer on a target object or an item in a menu. In most cases, the temporary dialog box will be closed once the pointer moves to the outside of the boundary of the dialog box. Alternatively, a user may open a preserved dialog box by moving the pointer across the targeted object or a marker line associated with the targeted object. The operation to invoke a preserved dialog box will be described later. Once a preserved dialog box is opened, it stays open until closed by the user. In most cases, moving the pointer out of the boundary of a preserved dialog box will not close the dialog box.

Figure 3A:
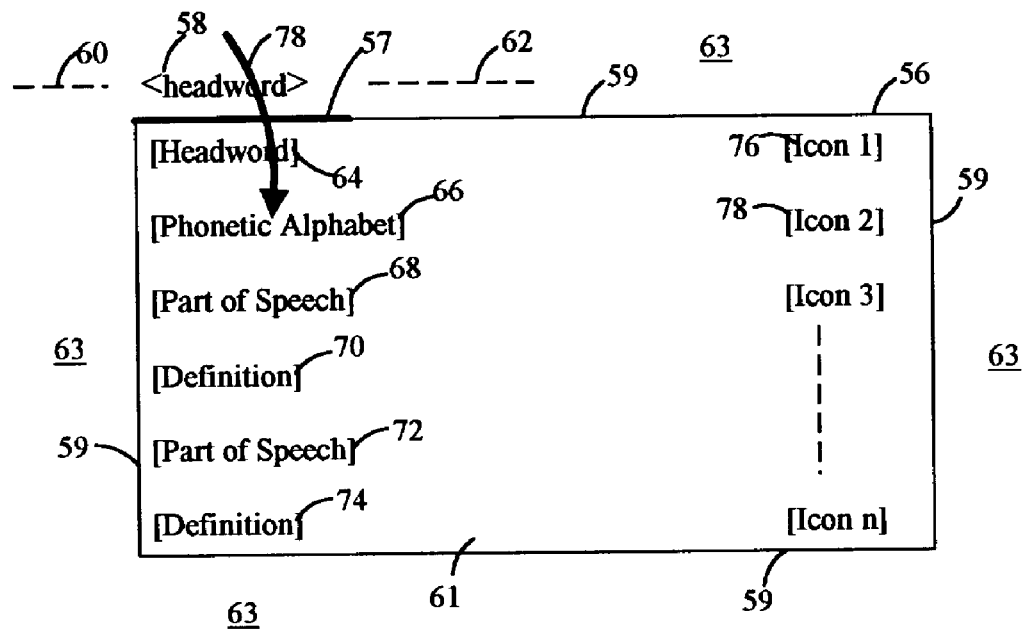
FIG. 3A is a diagram illustrating a method of opening a preserved principal dialog box and the contents of the principal dialog box.

In the case of an electronic dictionary, selecting an object means placing the pointer over a word in a text. As is illustrated in FIG. 3A, a user may open a temporary dialog box 56 by placing the pointer over the <headword> 58 for a predetermined period of time. The dialog box has a boundary. The boundary is identified as numeral 59 in FIG. 3A. The area 61 enclosed by the boundary 59 is said to be in the dialog box 56. The area 63 outside the boundary 59 is said to be at the outside of the dialog box 56. The <headword> 58 is a word in the displayed text that has been selected to display its definition and meaning in a dialog box. In this example, the <headword> 58 is the selected object. The <headword> 58 may have other words 60 and 62 in the text that are either in front of it or behind it. In order to display the dialog box 56, the pointer must at least be placed at the <headword> 58 momentarily, and no clicking on the mouse button is required. A threshold of a predetermined period of time is defined in order to trigger the display of a dialog box 56. This means that no dialog box will be opened if the user keeps moving the pointer across the text without stopping.

In this example, the dialog box 56 displays the headword 64, the phonetic alphabet 66 of the headword 64 (to show its pronunciation), the part of speech 68, and its definition 70 of the identified type of speech, or other types of speech 72 and their definitions. In the preferred embodiment, the dialog box 56 directly associated with the selected word is defined as the principal dialog box of the <headword> 58. Various icons 76, 78 are also shown in the dialog box 56. These icons indicate the availability of dialog boxes subordinate to this principal dialog box 56. Each icon represents a different type of information that may be displayed in the subordinate dialog box. In the case of an electronic dictionary, the subordinate dialog boxes may contain a simple translation of the headword 64, a complicated translation of the headword 64, or provide sample sentences in the subordinate dialog box. The icons 76, 78 may also represent the availability of subordinate dialog boxes which, for example, show the semantic variations of the headword 64, such as various senses of the headword 64; the synonym of the headword 64 along with multiple explanations and sample sentences; the antonym of the headword 64; a bilingual explanation of the headword 64, such as interpretation of the headword in Chinese, French, German, Japanese, Korean, Spanish, etc.; a sample pronunciation through loudspeaker or headphone playback (if there is a loudspeaker or a headphone); or illustrative phrases and sentences.

In the preferred embodiment, a user may place the pointer on one of the icons in the principal dialog box 56, such as a first icon 76, to open a subordinate dialog box cascaded to the principal dialog box 56. The user may move the pointer away from the selected icon 76 and place the pointers at second icon 78. In this case, the subordinate dialog box associated with the first icon 76 will be closed and a new subordinate dialog box associated with the second icon 78 will be opened. Each subordinate dialog box may have icons within in it so that a dialog box subordinate to the subordinate dialog box may be opened by placing the pointer on a selected icon in the subordinate dialog box. In the preferred embodiment, only one dialog box may be opened at one level. This means that if a subordinate dialog box of the first dialog box is opened, no other dialog boxes associated with other icons of the principal dialog box may be opened. To open another subordinate dialog box subordinate to the principal dialog box, the pointer must be placed at a different icon in the principal dialog box. Placing the pointer at a second icon automatically closes the dialog box associated with the first icon. In the preferred embodiment, as soon as the pointer is moved away from the first icon, the first subordinate dialog box will be closed. One exception to this principle is that the dialog box will not close if the pointer is moved into the dialog box subordinate to it. By putting the pointer at a second icon, a dialog box associated with the second icon will be opened. As a result, only one dialog box at a level can be opened at one time. However, many levels of subordinate dialog boxes can be opened simultaneously as long as the pointer remains pointing at one of the icons in the subordinate dialog box that opens the most junior subordinate dialog box. This operation will become clear in the description to follow. Likewise, by moving the pointer out of the principal dialog box 56, the principal dialog box 56 will be closed if it is a temporary dialog box. Closing the principal dialog box 56 closes all the subordinate dialog boxes cascaded to it.

Figure 3B:
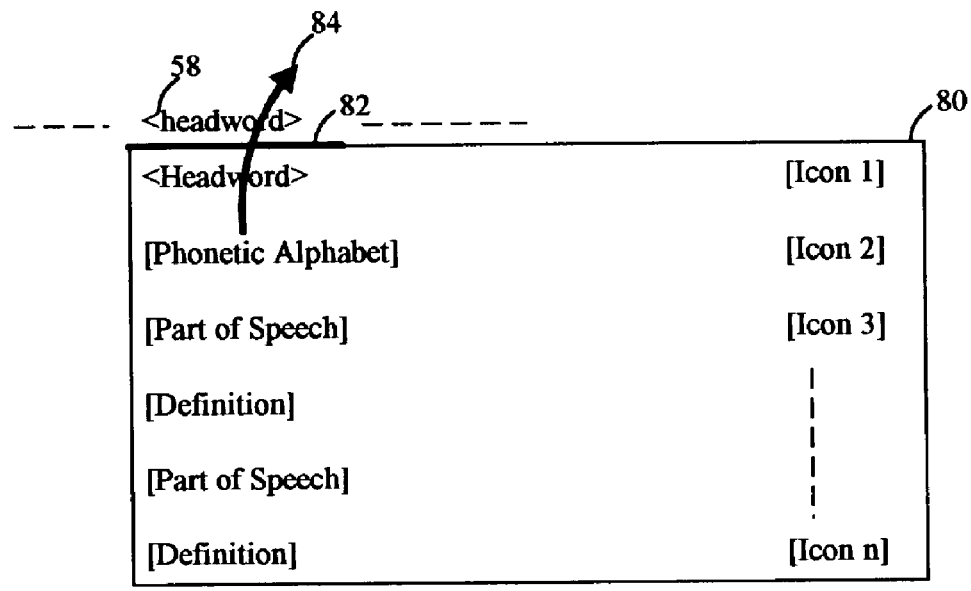
FIG. 3B is a diagram illustrating a method of closing a principal dialog box.

Refer to FIGS. 3A and 3B. Each dialog box 56, 80 has a marker line 57, 82 either below or above the <headword> 58, depending on the relative location of the dialog box 56, 80 to the <headword> 58 in the displayed window. The marker line 57, 82 serves two purposes: one is to indicate the item or <headword> 58 with which the dialog box 56 is associated; the other is to provide a channel to open or close the dialog box 56, 80. The marker line 57, 82 is a line either below or above the selected object and does not need to be visible on the display. Refer to FIG. 3A, in the preferred embodiment, moving the pointer across the marker line 57 opens a preserved principal dialog box 56. The marker line 57 is defined to be below the selected object. The marker line becomes visible after positioning the pointer at the object for a predetermined period of time to indicate that the object is being selected. The path of moving the pointer across the marker line 57 is indicated by arrow 78 shown in FIG. 3A. As a result, the principal dialog box 56 will be opened as a preserved dialog box. In this example, the dialog box 56 is located below the <headword> 58. Hence, the pointer must move downward across the marker line 57 and into the dialog box 56. As is described above, moving the pointer out of the preserved principal dialog box 56 will not close the dialog box 56. In the preferred embodiment, a user may close a preserved dialog box by placing the pointer to the outside of the dialog box and clicking a mouse button. The user may also close a dialog box by entering a keystroke on the keyboard. Alternatively, a user may close a preserved principal dialog box 80 by moving the pointer out of the dialog box across the marker line 82 as shown in FIG. 3B. The path of the pointer is shown by an arrow 84. In this example, the dialog box is below the <headword> 84 and the marker line 82. To close the preserved dialog box 80, the pointer must move upwardly across the marker line 82 as is shown by the arrow 84.

Figure 3C:
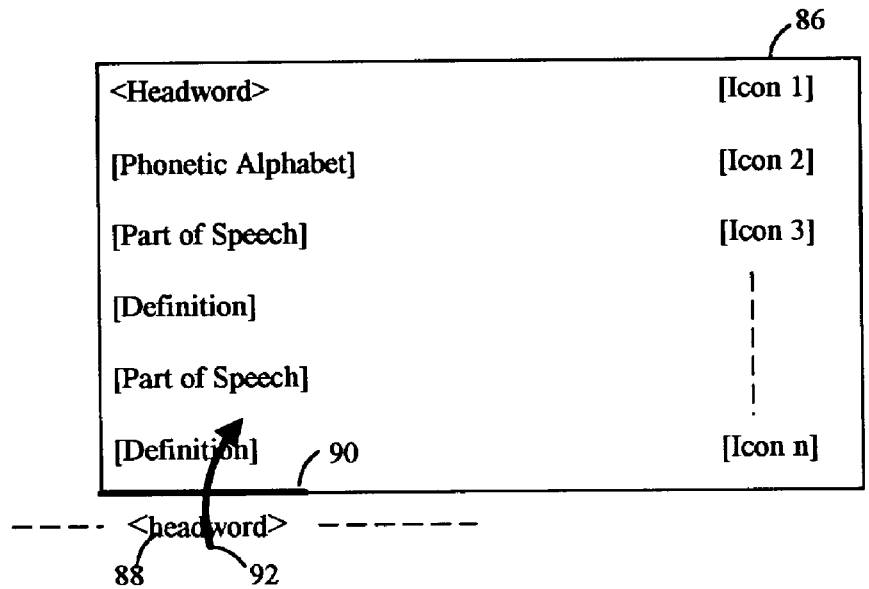
FIG. 3C is a diagram illustrating another method of opening a principal dialog box.
Figure 3D:
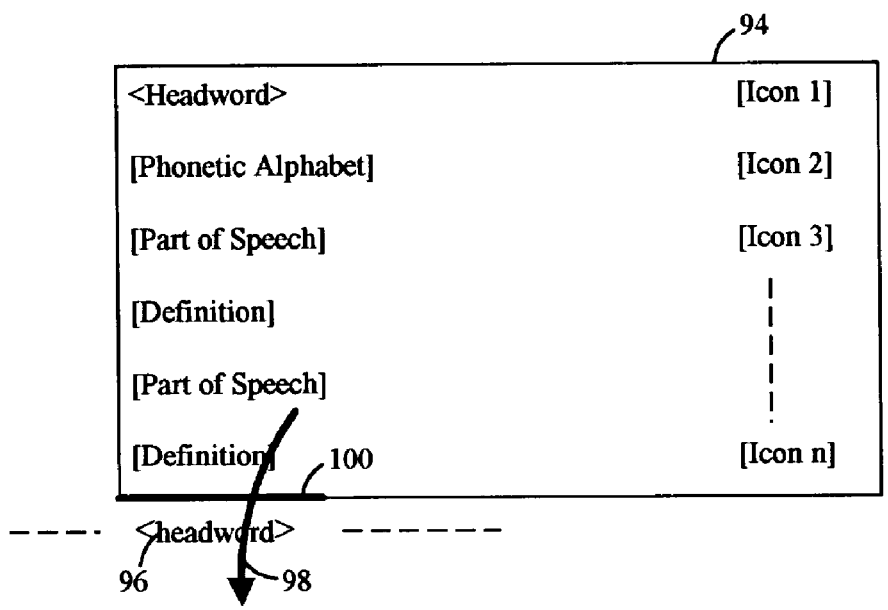
FIG. 3D is a diagram illustrating another method of closing a principal dialog box.

In the case where a preserved principal dialog box 86 will be opened to locate above a <headword> 88 as shown in FIG. 3C, the pointer must move upward across the marker line 90 or the selected object to open a preserved principal dialog box 86. The path of the pointer is shown by arrow 92. To close the preserved dialog box 94 located above the <headword> 96, as illustrated in FIG. 3D, the users must move the pointer downward across the marker line 100 or the selected object 96. The path of the pointer is shown by arrow 98 in FIG. 3D.

In the above examples, the marker lines 57, 82, 90, 100 are all indicated as part of the dialog boxes 56, 80, 86, 94 in heavier, thicker lines. In a computer system having a color display monitor, the marker line or the selected object may be represented in colors different from the border of the dialog box. Alternatively, the marker line may also be represented as part of the <headword> by highlighting the <headword>, or showing the <headword> in reverse video or a different color. Other alternatives may also be implemented as long as they can identify the selected <headword>.

Figure 4A:
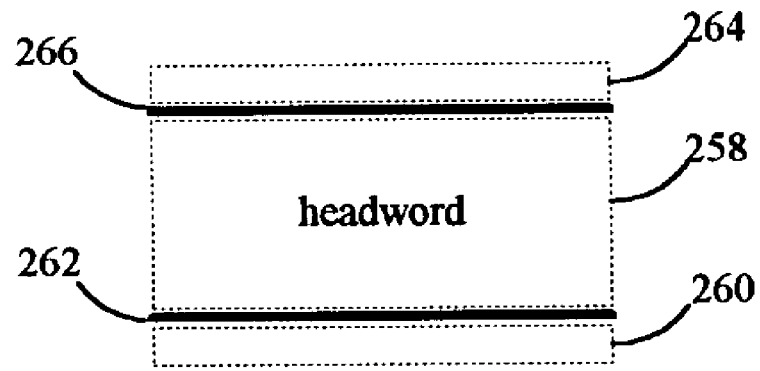
FIGS. 4A and 4B are diagrams showing the location of a marker line in reference to a selected object.

As shown above, a marker line is a line above or below a selected object. The relationship of a marker line to the selected object may be illustrated in FIGS. 4A and 4B. Refer to FIG. 4A. In a window display where a text is displayed, a headword is in a first region 258 of the window display. Below the headword is a second region 260. A first marker line 262 separates the second regions 260 from the first region 258. Similarly, a third region 264 is located above the first region 258. A second marker line 266 separates the third region 264 from the first region 258. When a pointer pauses in the first region 258 for a predetermined period of time indicates that the object in the first region 258 is selected, and a dialog box associated with the selected object should be opened accordingly. After the pause in the first region 258, a movement on the pointer to move into the second region 260 triggers a dialog box to open as illustrated in FIG. 3A. Likewise, following a pause in the first region 258, a movement on the pointer to enter into the third region 264 triggers a dialog box to open as illustrated in FIG. 3C. Marker line 262 may not be visible but exists between the first region 258 and the second region 260 as a border separating the first region 258 and the second region 260. Similarly, the second marker line 266 exists between the first region 258 and the third region 264, but may not be visible. The second region 260 is within the boundary of the dialog box associated with it. Likewise, the third regions is within the boundary of the principal dialog box associated with it. The dialog box associated with the second region 260 will be opened below the first region 258. The dialog box associated with the third region 264 will be opened above the first region 258.

Figure 4B:
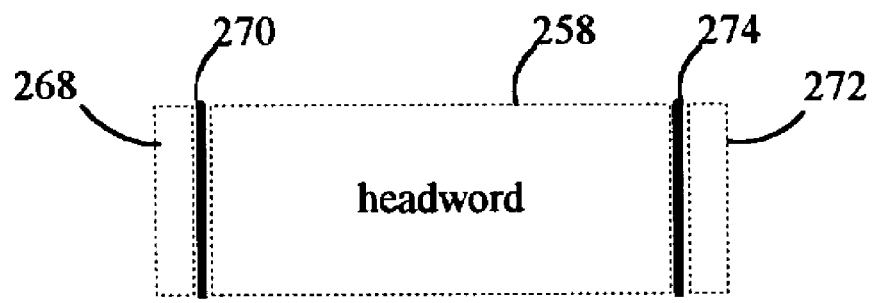

FIG. 4B is a diagram illustrating regions also exists to the left and right of the first region 258 of a headword. A fourth region 268 is to the left of the first region 258 and these two regions are separated by a third marker line 270. A fifth region 272 is to the right of the first region 258 and is separated by a fourth marker line 274. Moving a pointer from the first region 258 into the fourth region 268 or the fifth region 272 after pausing the pointer in the first region 258 for a predetermined period of time may also open a principal dialog box for the selected object.

Figure 5A:
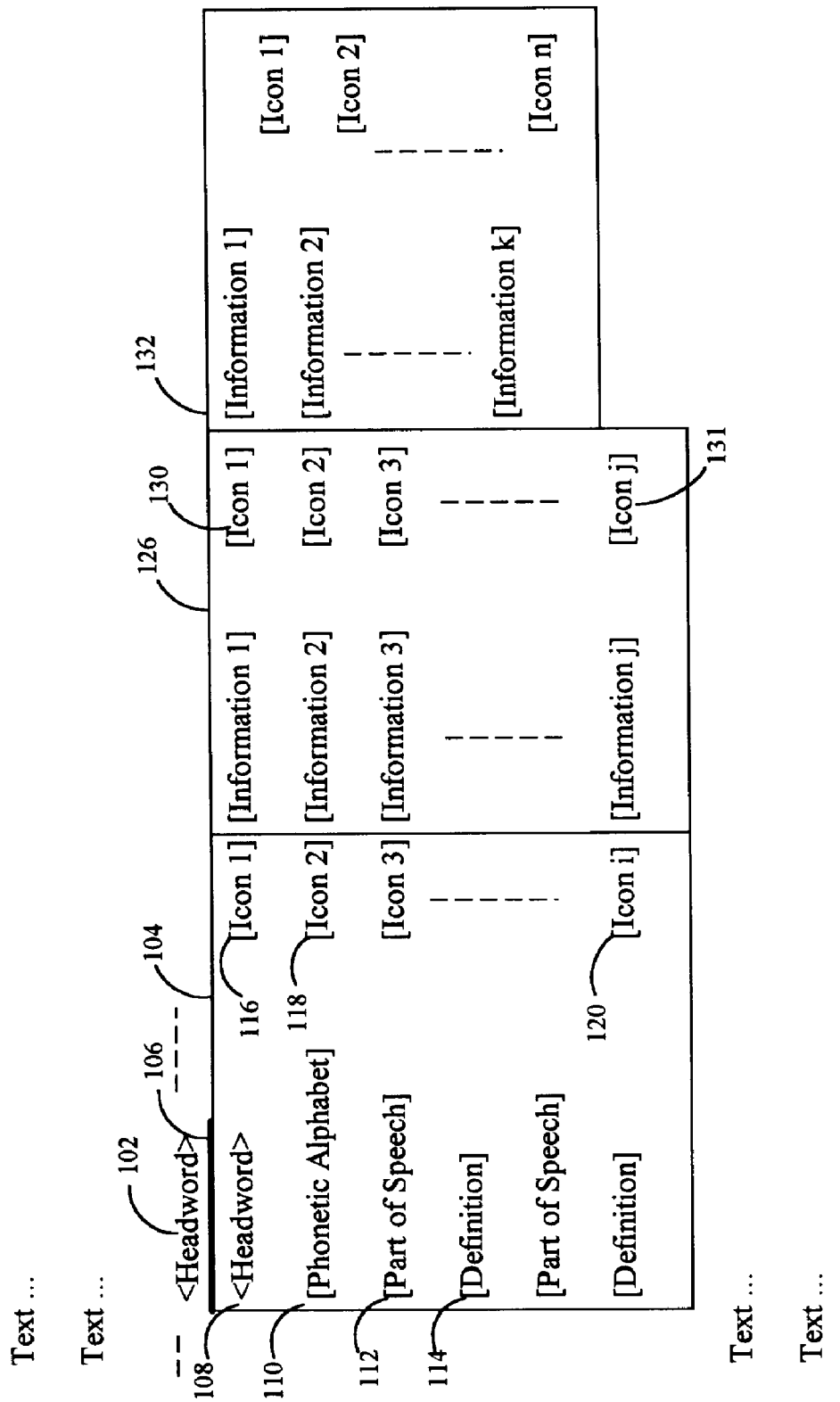
FIGS. 5A–5D and FIGS. 6A–6B illustrate dialog boxes of a family of dialog boxes being displayed in the same window.
Figure 5B:
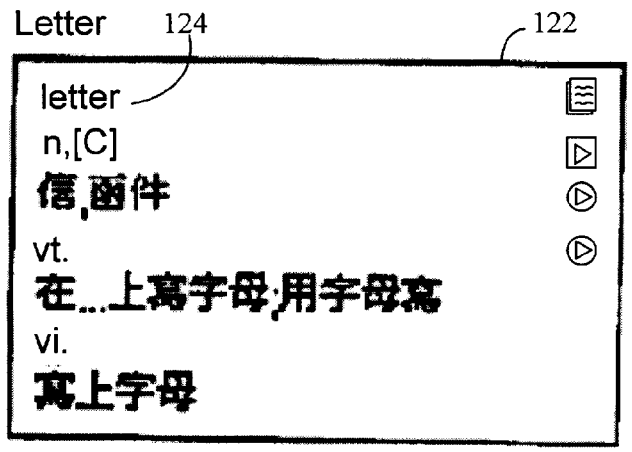

FIG. 5A is a diagram illustrating a structure of cascaded dialog boxes of the present invention. This example also illustrates an electronic dictionary application of the present invention. In this example, a monitor displays an article. The user may be interested in looking up the definition or application of a word in the text. That word is indicated as <headword> 102 in this example. The user may either open a temporary dialog box or a preserved dialog box through the methods described above (whether the principal dialog box is a preserved one or a temporary one is irrelevant to this example). A principal dialog box 104 is below the <headword> 102. A marker line 106 is underneath the <headword> 102. In the principal dialog box 104, the selected <headword> 102 is identified as headword 108. Phonetic alphabet 110, part of speech 112 and definition 114 of the headword are also shown in the principal dialog box 104. The principal dialog box 104 also contains a plurality of icons 116, 118 and 120. The principal dialog box 104 may also contain no icon or only one icon. The presence of an icon 106 in the dialog box indicates the availability of additional information related to the <headword> 108 which is associated to the icon 116. To illustrate this scenario, an example of an instant translation of a bilingual dictionary is shown in FIG. 5B. In FIG. 5B, the principal dialog box 122 contains the bilingual translation of the <headword> 124 "letter" in Chinese.

Figure 5C:
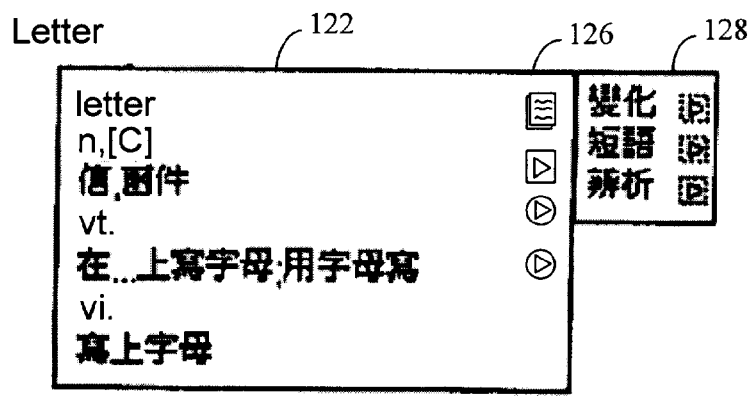
Figure 5D:
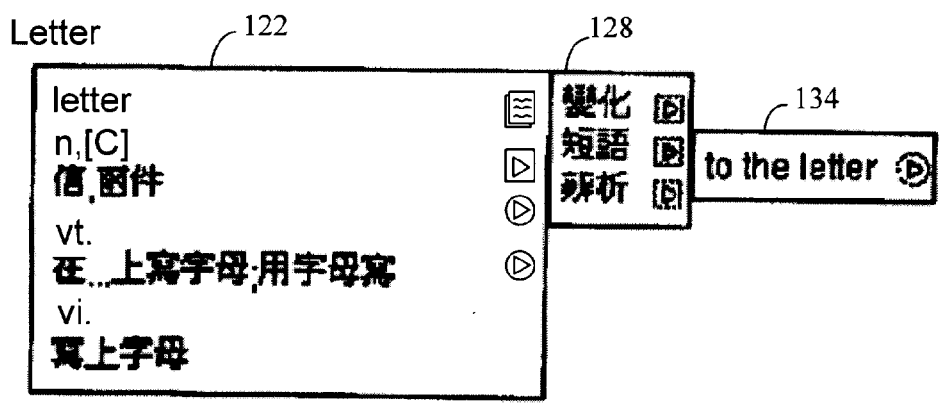

Moving the pointer to the first icon 116 of the principal dialog box 104 opens a first subordinate dialog box 126. An example illustrating this scenario is shown in FIG. 5C. In FIG. 5C, an instant translation of a bilingual dictionary in Chinese is shown, wherein the first subordinate dialog box 128 is concatenated to the principal dialog box 122. The first subordinate dialog box 126 contains icons 130, 131 that link to another level of dialog boxes. Moving the pointer to point at a first icon 130 in the first subordinate dialog box 126 opens a second subordinate dialog box 132. This scenario can be illustrated in a bilingual dictionary shown in FIG. 5D, wherein the second subordinate dialog box 134 is hierarchically related to the first subordinate dialog box 128.

Moving the pointer from the second subordinate dialog box 126 back into the first subordinate dialog box 122 closes the second subordinate dialog box 126. Moving the pointer out of the second subordinate dialog box without moving into the first subordinate dialog box closes both the first and second subordinate dialog boxes 122 and 126.

If the principal dialog box is a temporary dialog box, moving the pointer out of the most junior subordinate dialog box without moving into any other subordinate dialog boxes or the principal dialog box closes all the dialog boxes associated with the selected <headword>.

Figure 6A:
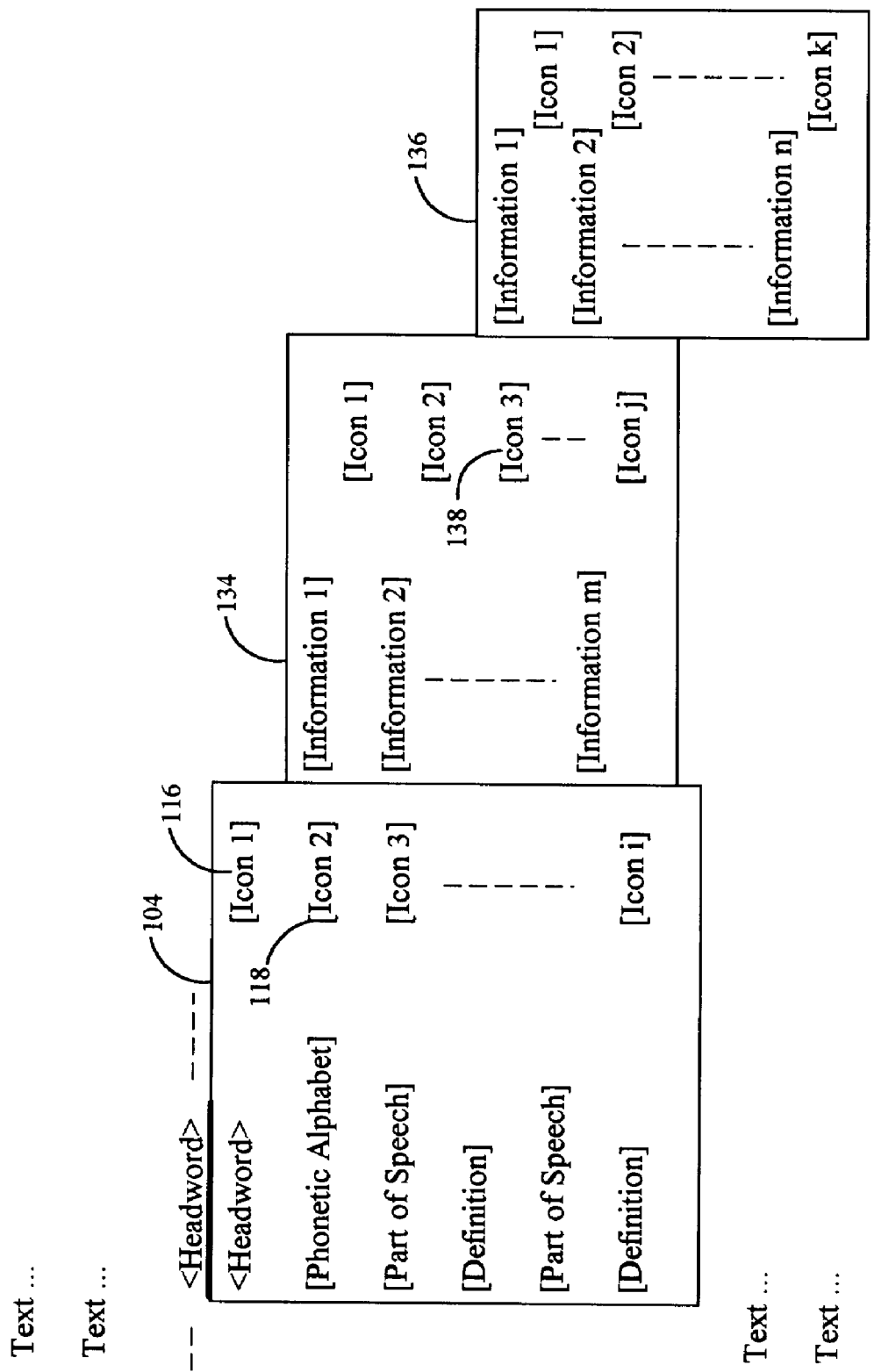
Figure 6B:
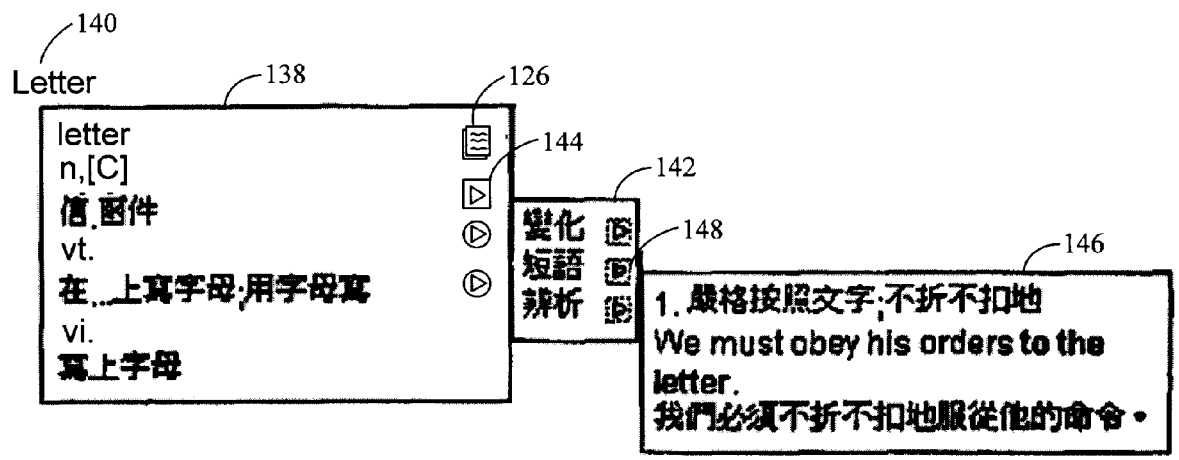

Refer to FIG. 6A. Moving the pointer from the first icon 116 of the principal dialog box 104 to the second icon 118 closes the first subordinate dialog box 126 and opens a third subordinate dialog box 134. The third subordinate dialog box 134 is at the same level as the first subordinate dialog box 126 (as shown in FIG. 5A). They both are at the first level subordinate to the principal dialog box 104. Similarly, a fourth subordinate dialog box 136 can be opened by putting the pointer at the third icon 138 in the third subordinate dialog box 134. This scenario can be illustrated in an electronic dictionary as shown in FIG. 6B. In FIG. 6B, the principal dialog box 138 is opened for the <headword> 140 "letter." A first subordinate dialog box 142 is opened because the pointer was pointing at the second icon 144 of the principal dialog box 138. Consequently, the subordinate dialog box associated with the first icon 126 is closed. A second subordinate dialog box 146 is opened as the pointer is positioned on the third icon 148 of the first subordinate dialog box 142.

There is no particular restriction on how many levels of dialog box can be opened under one headword. The contents to be displayed in the dialog boxes are retrieved from the database 26 and stored in the storage buffer 16. The number of dialog boxes that can be cascaded to one selected object depends on the amount of memory available in the storage buffer 16. More dialog boxes require more memory, which results in higher cost to build such a device. Based on the practical usage and economic considerations, the preferred embodiment of the present invention limits the number of dialog boxes to five per selected object. As a result, each selected object may have one principal dialog box and up to four subordinate dialog boxes opened simultaneously.

In the presently preferred embodiment, multiple principal dialog boxes may be opened simultaneously. Similar to the economic consideration applied to limiting the number of subordinate dialog boxes. In the present invention, the number of principal dialog boxes that may be opened simultaneously is limited to five. However, this limitation may be removed when the cost of memory is reduced so that more memory may be installed and supported in a system.

Figure 7A:
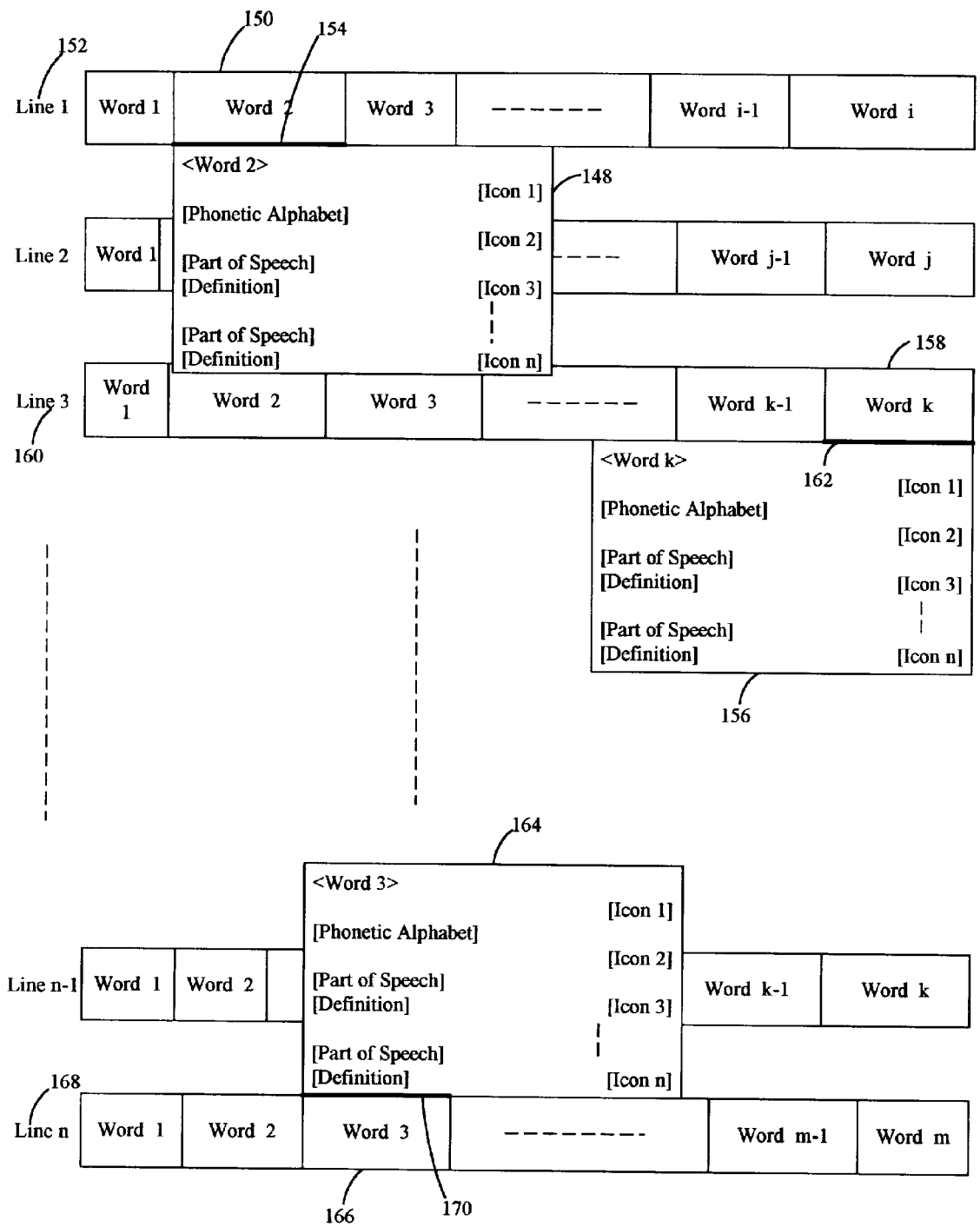

FIG. 7A is a diagram illustrating a window display having multiple dialog boxes opened in an electronic dictionary. In this example, three principal dialog boxes are opened simultaneously. A first principal dialog box 148 is associated with 2 (150) of line 1 (152) in the display. A marker line 54 is shown underneath word 2 (150). The first principal dialog box 148 is located below word 2 (150) and is expanded rightward. A second principal dialog box 156 is associated with word k (158) of line 3 (160). A marker line 162 is underneath word k (158). The second principal dialog box 156 is below word k (158) and expands toward the left of the monitor because word k (158) is located near the right edge of the display and there is insufficient window space to the right of work K (158) to display the dialog box. A third principal dialog box 164 is associated with word 3 (166) of line n (168). A marker line 170 is above word 3 (166) in line n (168) and underneath the dialog box 164. Because line n (168) is located near the bottom of the display, the dialog box 164 can only be opened above word 3 (166). Because there is insufficient space on the window space on the window space to display the dialog box 164 below word 3 (166), and there is space on the display for the dialog box to expand toward the right, the dialog box 164 is expanded toward the right.

An example of the scenario described above is illustrated in FIG. 7B. In this example an article is displayed in a bilingual electronic dictionary. Five preserved principal dialog boxes are opened. The first principal dialog box 172 is opened for the word "virtual" 174. It also indicates the word class 176 for "virtual" (i.e., an adjective) and its meaning in a foreign language 178. In this example, the bilingual translation is shown in Chinese. Two icons 180 and 182 are shown in the dialog box 172, indicating that two subordinate dialog boxes can be cascaded from the first principal dialog box 172. The second principal dialog box 184 is opened for the word "manager." The parts of speech indicates the word "manager" is a noun 185. The second principal dialog box 184 has three icons 186, 188 and 190. The three icons in the second principal dialog box indicate that three subordinate dialog boxes can be opened under the second principal dialog box 184. The third principal dialog box 192 is opened for the word "introduction." All these principal dialog boxes are located below the selected words and are all expanded toward the right. The location of the dialog boxes are selected by the manner as depicted in FIG. 2A. The fourth principal dialog box 194 is for the word "protection." This dialog box is below the headword "protection," and first expands to the right edge of the window display and expands to the left to display the entire content of the dialog box. The location of the fourth principal dialog box 194 is selected by the manner as illustrated in FIG. 2C. The fifth principal dialog box 196 is opened for the word "service." A first subordinate dialog box 198 is opened next to the fifth principal dialog box 196. The first subordinate dialog box 198 is opened by putting the pointer at the fourth icon 200 in the fifth principal dialog box 196. A second subordinate dialog box 202 is further cascaded from the fifth principal dialog box 196 family. The second subordinate dialog box 202 is opened by placing the pointer on the only icon 204 in the first subordinate dialog box 198. Because the second subordinate dialog box 202 is subordinate to the first subordinate dialog box 198, the second subordinate dialog box 202 is opened adjacent to the first subordinate dialog box 198.

As is illustrated in the example shown in FIG. 7B, a plurality of dialog boxes can be opened simultaneously in a single window display. This is especially convenient to person who uses the electronic dictionary to look up a lot of words in an article. The user may forget the meaning of a word he previously looked up when he is looking up another word. This feature of displaying a multiple dialog boxes in one window display will benefit users of electronic dictionary, especially in the case of a bilingual electronic dictionary.

As is described above, the preferred embodiment of the present invention allows a maximum of five groups of principal dialog boxes to be shown in one window display. This limitation is based on the size of the storage buffer 16. The present invention uses a first-in-first-out (FIFO) algorithm in managing the storage buffer 16. This means that when a user asks to open a sixth principal dialog box, the first principal dialog box will automatically be closed. Having five groups of dialog box open simultaneously in one window display is reasonable, because the more dialog boxes are opened, the more texts will be blocked off by the dialog boxes. The more dialog boxes are opened, the less the user can see the text. Moreover, the more dialog boxes are allowed to open, the more storage buffers must be allocated. Based on practical and economic reasons, a maximum of five families of dialog boxes to be opened at the same time in the same window would be a reasonable choice for hand-held devices where a low amount of memory is available.

Figure 8:
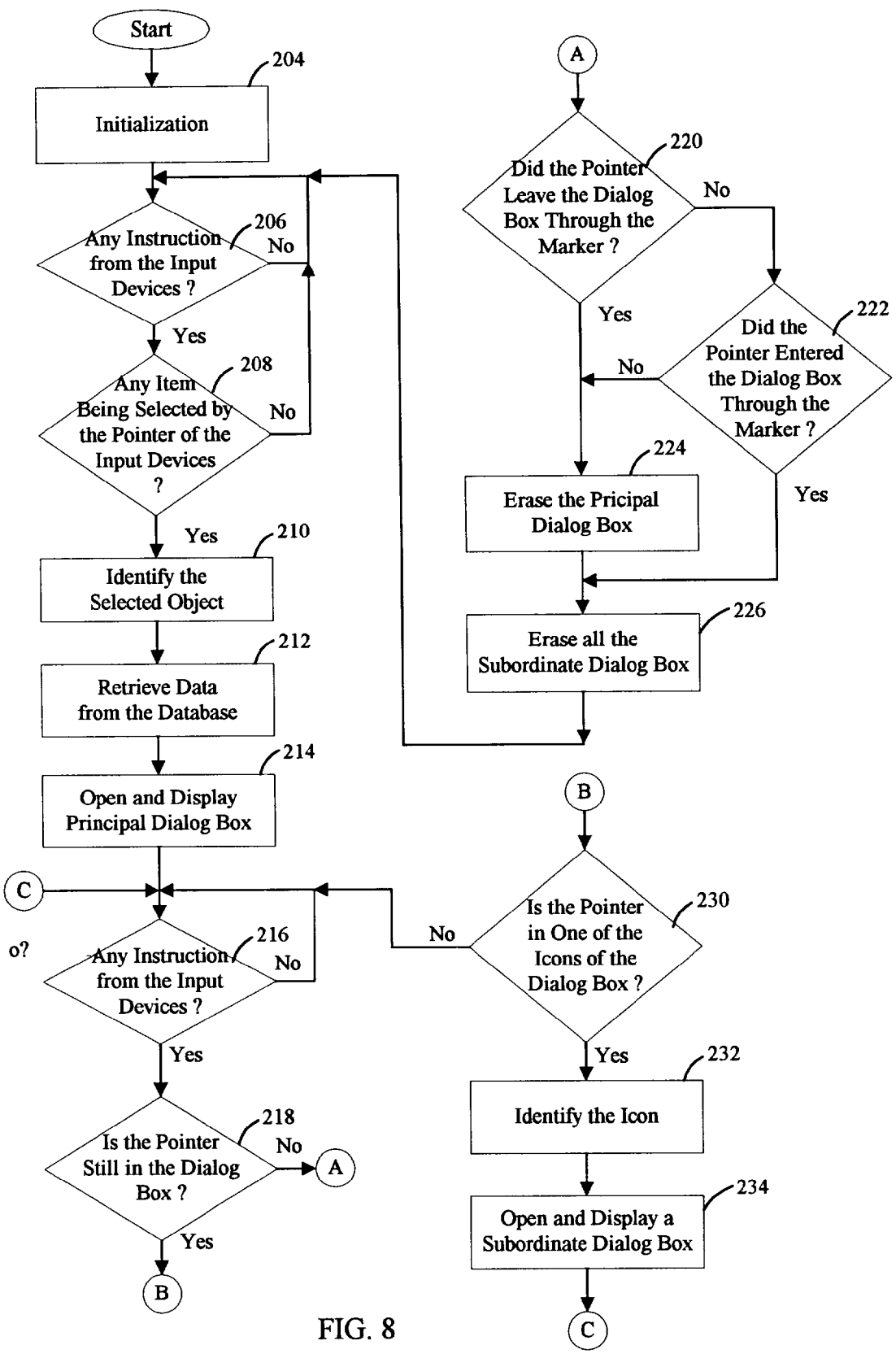
FIG. 8 is a flow diagram illustrating the process of displaying messages in a window.

The process of displaying multiple dialog boxes in a window display is achieved by the following sequence of operations. Refer to FIG. 8. The processing unit initializes the system (step 204), which includes setting up header information for a dialog box, establishing a data structure, determining dialog box sizes, determining the number of characters that can be displayed in a dialog box, setting up the storage buffer and size of each buffer, etc. The next step (206) determines if any of the input devices (such as the mouse) have been activated. If so, the mouse pointer may have been pointing at a displayed object. An object is selected (step 208) if the pointer is momentarily placed at the object or performs an act to open a preserved dialog box as described above. The processing unit also determines if the selected item is a word. The processing unit continues to check for a selection by the pointer if the pointer does not indicate that an object has been selected (loop back to step 206).

If an object has been selected, the next step is to identify the selected object (or word) (step 210). The selected word could perfectly match a word in the database, or a word that is closest to the selected word will be used for displaying the information in the dialog box. The present invention provides a unique way to match the selected word with the perfect match or closest match in the electronic dictionary. This matching process will be discussed later.

After identifying the selected word, information related to the selected word will be retrieved from the database (step 212), and the amount of data to be displayed will also be available. Based on the received information to be displayed, the size and the location of the dialog box can be determined and opened. Information related to the selected word can be displayed in a principal dialog box (step 214).

After displaying the information in the principal dialog box, the processing unit 10 checks whether the pointer has been moved again (step 216). The processing unit keeps monitoring the movement on the pointer until it notices that the pointer has been moved. The processing unit then checks if the pointer is still in the principal dialog box (step 218). If the pointer is no longer in the principal dialog box, it is important to find out whether or not the pointer exited the dialog box by crossing the marker line (step 220). This step is an important one because it determines whether the principal dialog box should remain displayed. If the pointer leaves the principal dialog box by moving across the marker line, then it is necessary to close the principal dialog box (step 224). Otherwise, it will depend on whether the principal dialog box is a preserved dialog box or a temporary dialog box. The principal dialog box is a preserved dialog box if it is opened as the pointer crosses the marker line (step 222) or the selected word as described above. By contrast, the principal dialog box is a temporary dialog box if the dialog box is opened upon detecting that the pointer has momentarily stayed on the selected word. If the principal dialog box is a temporary dialog box, then the principal dialog box must be closed when the pointer leaves the dialog box (step 224). Regardless of the status of the principal dialog box, i.e. a preserved one versus a temporary one, all the subordinate dialog boxes must be closed when the pointer is no longer within the area of the principal dialog box (step 226). After closing the appropriate dialog boxes, the operation checks for further movement of the pointer. Movement on the pointer would start the process over again.

At step 218, the processing unit checks whether the pointer is still in the principal dialog box. If the pointer is still within the area of the principal dialog box, the processing unit checks if the pointer is placed on one of the icons of the principal dialog box (step 230). If the pointer is placed on one of the icons, the processing unit then checks which icon that the pointer is pointed to (step 232). The processing unit then opens and displays the subordinate dialog box that is associated with the icon (step 234). After the subordinate dialog box is opened and the contents are displayed, the processing unit continues to check if the pointer makes any more movement and, if so, it processes the operation accordingly.

Figure 9:
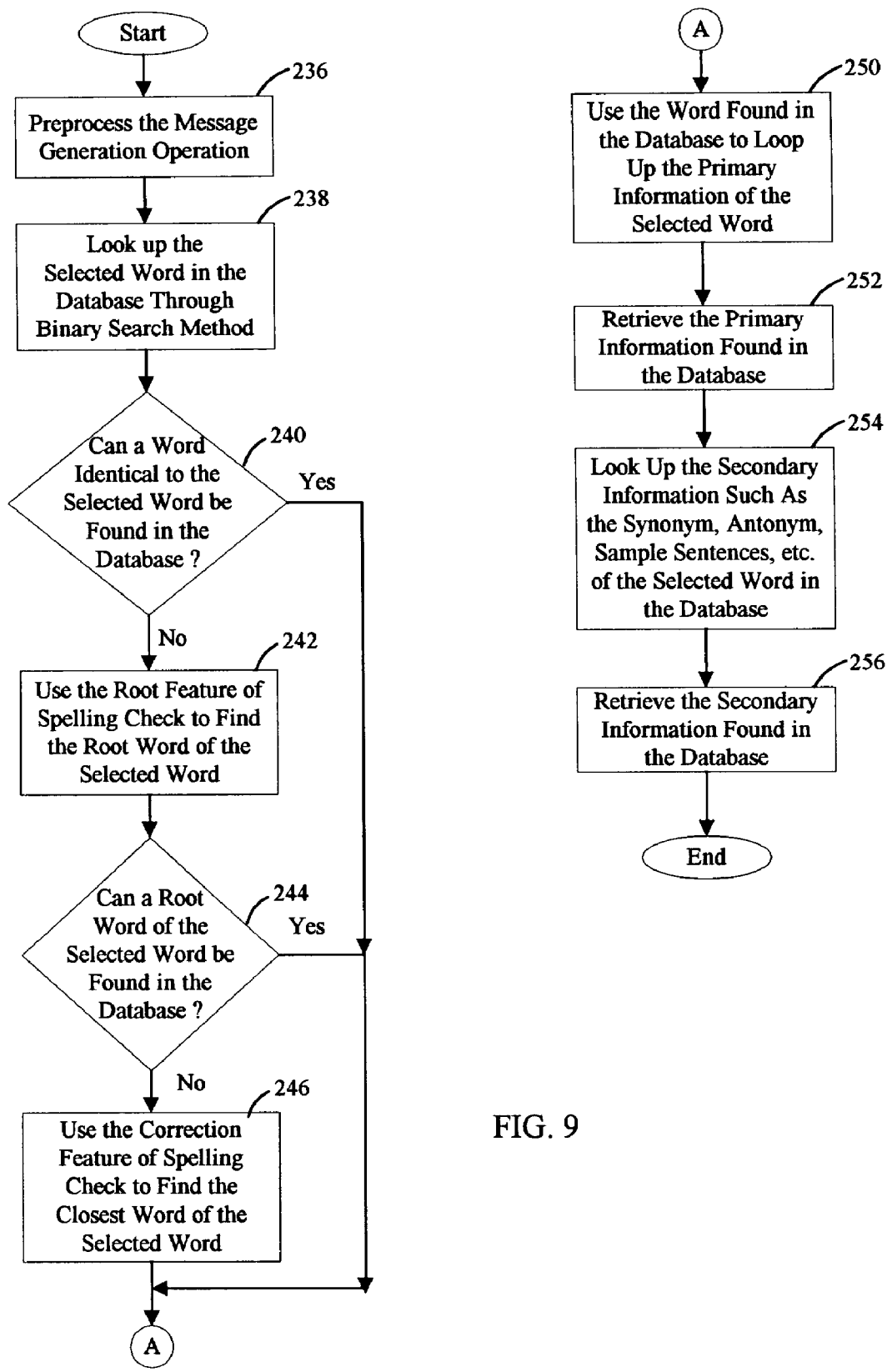
FIG. 9 is a flow diagram illustrating the process of recognizing a selected word.

The process of comparing the selected word of the preferred embodiment is achieved by the following sequence of operations. Refer to FIG. 9. A preprocess operation is first performed (step 236). In the preprocess operation, a filtering process removes all of the extra spaces before or after the selected word. The preprocess operation also removes the punctuation or extra symbols around the selected word, because the punctuation and symbols are not part of the selected word and cannot be found in the database. After stripping the punctuation and extra symbols around the word, a database search looking for a word that matches perfectly with the selected word is performed (step 238). The search is performed by a binary search method. Binary search is a quick method for searching for a particular record. In the present case, the search will be for identifying a particular word that perfectly matches the selected word. The goal of the binary search is to find a perfect match for the selected word in the database (step 240).

If no word in the database can be found that perfectly matches the selected word, then a method of using root feature of the spelling checker is used to find the root word that matches with the selected word (step 242). In the root feature, words in the plural form or the past tense are returned to their original root form, which means "s" or "ed" or the like at the end of the word is removed. After using the root feature of the spelling check, the next step is to check if a match to the root word can be found in the database (step 244). If no word in the database can be found to match the root word, the process continues with the correction feature of the spelling check to find a word in the database that is closest to the selected word (step 246). In this step, because it is suspected that there was a typographic error in the selected word, the closest match to the selected word is suggested by the spelling check.

Whether the perfect match is found, or a match to the root word is found, or a closest match to the selected word is suggested, the next step is to find the information in the database based on the word found or the word suggested as the closest word (step 250). The next step is to retrieve the information found in the database and display the information in the primary dialog box (step 252). After displaying the information in the principal dialog box, further information regarding the word is searched in the database for the synonym, antonym, sample sentences, etc. (step 254). After finding such related information, the information is retrieved for display upon request (step 256). The process terminates after finding and retrieving all relevant information about the word identified.

Although the examples are mostly illustrated in the electronic dictionary, the message display system described above may be used in other applications. The electronic diary or the personal organizer are examples where the preferred embodiment may also be applied. The process of displaying information in the dialog box can be used to display appointment schedules, personal notes, etc., in an electronic diary or personal organizer. Similar to the application of an electronic dictionary, the above described embodiment can be used to display multiple dialog boxes in an electronic diary or personal organizer to show multiple activities in the same window at the same time.

While the invention has been particularly shown and described with reference to certain embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A method for generating a dialog box in an environment of window display using a pointer associated with a pointing device wherein the pointing device has a button usually used for invoking a command in the window environment, comprising the steps of:

selecting an object by placing the pointer over the object for a predetermined period of time; and moving the pointer downward across the selected object to open a principal dialog box associated with the selected object, the dialog box has a boundary, wherein the area enclosed by the boundary is within the dialog box and the area outside the boundary is outside the dialog box, the principal dialog box remains opened even though the pointer has moved out to the outside of the principal dialog box.

2. A method for generating a dialog box in an environment of window display using a pointer associated with a pointing device wherein the pointing device has a button usually used for invoking a command in the window environment, comprising the steps of:

selecting an object by placing the pointer over the object for a predetermined period of time;

defining a marker line below the selected object wherein the marker line becomes visible after placing the pointer at the object for a predetermined period of time to indicate that the object is being selected; and moving the pointer downward across the marker line to open a principal dialog box associated with the selected object, the principal dialog box has a boundary, wherein the area enclosed by the boundary is within the dialog box and the area outside the boundary is outside the dialog box, the principal dialog box remains opened even though the pointer has moved to the outside of the principal dialog box.

3. The method of generating a dialog box in an environment of window display of claim 1 or 2, further comprising the steps of:

retrieving information related to the selected object; and displaying the retrieved information in the opened principal dialog box.

4. The method of generating a dialog box in an environment of window display of claim 3, further comprising the steps of:

displaying an icon within the principal dialog box indicating the availability of additional information related to the selected object;

selecting the icon by placing the pointer at the icon; and opening a subordinate dialog box subordinate to the principal dialog box.

5. The method of generating a dialog box in an environment of window display of claim 4, further comprising the steps of:

retrieving information associated with the selected icon; and displaying the retrieved information in the opened subordinate dialog box.

6. The method of generating a dialog box in an environment of window display of claim 5, further comprising the steps of:

displaying an icon within the subordinate dialog box indicating the availability of additional information related to the selected object;

selecting the icon in the subordinate dialog box by placing the pointer at the icon; and opening a second subordinate dialog box subordinate to the subordinate dialog box, wherein the principal dialog box, the first subordinate dialog box, and the second subordinate dialog box are hierarchically related to one another.

7. The method of generating a dialog box in an environment of window display of claim 6, further comprising the steps of:

retrieving information associated with the selected icon in the subordinate dialog box; and displaying the retrieved information in the second opened subordinate dialog box.

8. The method of generating a dialog box in an environment of window display of claim 1, further comprising the steps of:

placing the pointer in the dialog box; and moving the pointer upwardly across the selected object to close the principal dialog box.

9. The method of generating a dialog box in an environment of window display of claim 1 or 2, further comprising the steps of:

placing the pointer to the outside of the dialog box; and clicking the button on the pointing device to close the principal dialog box.

10. The method of generating a dialog box in an environment of window display of claim 2, further comprising the steps of:

placing the pointer in the dialog box; and moving the pointer upwardly across the marker line to close the principal dialog box.

11. A method for generating a dialog box in an environment of window display using a pointer associated with a pointing device wherein the pointing device has a button usually used for invoking a command in the window environment, comprising the steps of:

selecting an object by placing the pointer over the object; and moving the pointer upward across the selected object to open a principal dialog box associated with the selected object, the dialog box has a boundary, wherein the area enclosed by the boundary is within the dialog box and the area outside the boundary is outside the dialog box, the principal dialog box remains opened even though the pointer has moved out to the outside of the principal dialog box.

12. A method for generating a dialog box in an environment of window display using a pointer associated with a pointing device wherein the pointing device has a button usually used for invoking a command in the window environment, comprising the steps of:

selecting an object by placing the pointer over the object;

defining a marker line above the selected object wherein the marker line becomes visible after placing the pointer at the object for a predetermined period of time to indicate that the object is being selected; and moving the pointer upward across the marker line to open a principal dialog box associated with the selected object, the principal dialog box has a boundary, wherein the area enclosed by the boundary is within the dialog box and the area outside the boundary is outside the dialog box, the principal dialog box remains opened even though the pointer has moved to the outside of the principal dialog box.

13. The method of generating a dialog box in an environment of window display of claim 11 or 12, further comprising the steps of:

retrieving information related to the selected object; and displaying the retrieved information in the opened principal dialog box.

14. The method of generating a dialog box in an environment of window display of claim 13, further comprising the steps of:

displaying an icon within the principal dialog box indicating the availability of additional information related to the selected object;

selecting the icon by placing the pointer at the icon; and opening a subordinate dialog box subordinate to the principal dialog box.

15. The method of generating a dialog box in an environment of window display of claim 14, further comprising the steps of:

retrieving information associated with the selected icon; and displaying the retrieved information in the opened subordinate dialog box.

16. The method of generating a dialog box in an environment of window display of claim 15, further comprising the steps of:

displaying an icon within the subordinate dialog box indicating the availability of additional information related to the selected object;

selecting the icon in the subordinate dialog box by placing the pointer at the icon; and opening a second subordinate dialog box subordinate to the subordinate dialog box, wherein the principal dialog box, the first subordinate dialog box, and the second subordinate dialog box are hierarchically related to one another.

17. The method of generating a dialog box in an environment of window display of claim 16, further comprising the steps of:

retrieving information associated with the selected icon in the subordinate dialog box; and displaying the retrieved information in the second opened subordinate dialog box.

18. The method of generating a dialog box in an environment of window display of claim 11, further comprising the steps of:

placing the pointer in the dialog box; and moving the pointer downward across the selected object to close the principal dialog box and its subordinate dialog boxes.

19. The method of generating a dialog box in an environment of window display of claim 11 or 12, further comprising the steps of:

placing the pointer to the outside of the dialog box; and clicking the button on the pointing device to close the principal dialog box.

20. The method of generating a dialog box in an environment of window display of claim 12, further comprising the steps of:

placing the pointer in the dialog box; and moving the pointer downward across the marker line to close the principal dialog box and its subordinate dialog boxes.

21. The method of generating a dialog box in an environment of window display of claim 1 or 11, further comprising the steps of:

displaying the selected object in reverse video.

* * * * *